(12) United States Patent
Yang

(10) Patent No.: US 7,805,514 B2
(45) Date of Patent: Sep. 28, 2010

(54) ACCESSING RESULTS OF NETWORK DIAGNOSTIC FUNCTIONS IN A DISTRIBUTED SYSTEM

(76) Inventor: Harold (Haoran) Yang, 755 E. Capital Ave., #L-205, Milpitas, CA (US) 95035

( * ) Notice: Subject to any disclaimer, the term of this patent is extended or adjusted under 35 U.S.C. 154(b) by 1735 days.

(21) Appl. No.: 10/704,474

(22) Filed: Nov. 7, 2003

(65) Prior Publication Data
US 2005/0050189 A1 Mar. 3, 2005

Related U.S. Application Data

(60) Provisional application No. 60/498,249, filed on Aug. 26, 2003.

(51) Int. Cl.
G06F 13/00 (2006.01)
(52) U.S. Cl. .................. 709/226; 709/217; 709/224
(58) Field of Classification Search .......... 709/217, 709/219, 223, 226
See application file for complete search history.

(56) References Cited

U.S. PATENT DOCUMENTS

| | | | |
|---|---|---|---|
| 5,754,552 A | 5/1998 | Allmond et al. | |
| 6,335,931 B1 | 1/2002 | Strong et al. | |
| 6,507,923 B1 | 1/2003 | Wall et al. | |
| 6,697,969 B1 * | 2/2004 | Merriam | 714/46 |
| 6,724,729 B1 | 4/2004 | Sikdar | |
| 6,745,351 B1 | 6/2004 | Mastro | |
| 7,225,245 B2 * | 5/2007 | Gurumoorthy et al. | 709/223 |
| 7,242,862 B2 * | 7/2007 | Saunders et al. | 398/30 |
| 2003/0064719 A1 * | 4/2003 | Horne | 455/423 |
| 2003/0225549 A1 * | 12/2003 | Shay et al. | 702/182 |

* cited by examiner

Primary Examiner—Viet Vu (57) ABSTRACT

The principles of the present invention extend to accessing results of network diagnostic functions in a distributed system. A chassis allocates resources for performing a network diagnostic function directly to requesting computer system. The requesting computer system communicates directly with the allocated resources to initiate the network diagnostic function. The network diagnostic test continues to execute even if the requesting computer system subsequently malfunctions. Collected test results are stored at the chassis such that any network connectable computer system can access the collected test results. A monitoring computer system (which may or may not be the requesting computer system) requests collected test results corresponding to the network diagnostic function. The chassis identifies appropriate test results and returns the results to the monitoring computer system.

25 Claims, 5 Drawing Sheets

ACCESSING RESULTS OF NETWORK DIAGNOSTIC FUNCTIONS IN A DISTRIBUTED SYSTEM

1. CROSS REFERENCE TO RELATED APPLICATIONS

The present application claims priority to U.S. Provisional Patent Application Ser. No. 60/498,249 entitled "Accessing Results Of Network Diagnostic Functions In A Distributed System" filed Aug. 26, 2003, which is hereby incorporated by reference.

BACKGROUND OF THE INVENTION

1. The Field of the Invention

The present invention relates to network testing, and more specifically, to accessing results of network diagnostic functions in a distributed system.

2. Background and Relevant Art

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fiber Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Demand for increased network bandwidth, in particular, has been the driving force behind many advancements in the area of high speed communication systems, methods and devices.

However, as communication networks have increased in size, speed, and complexity, they have become increasingly likely to develop a variety of problems that, in practice, are often difficult to diagnose and resolve. Communication network problems are of particular concern in light of the continuing demand for high levels of network operational reliability and for increased network capacity. The problems generally experienced in network communications can take a variety of forms and may occur as a result of a variety of different circumstances.

Examples of circumstances, conditions and events that may give rise to network communication problems include the transmission of unnecessarily small frames of information, inefficient or incorrect routing of information, improper network configuration and superfluous network traffic, to name just a few. These problems are aggravated by the fact that communication networks are continually changing and evolving due to growth, reconfiguration and introduction of new network topologies and protocols. Moreover, new network interconnection devices and software applications are constantly being introduced and implemented. The frequency of change in communication network configurations highlights the need for effective, reliable, and flexible diagnostic mechanisms.

Accordingly, some diagnostic devices and tests can be utilized to assist a network administrator in identifying existing network conditions that are causing a network to deviate from expected performance. Similarly, other diagnostic devices and tests can be utilized to proactively identify network conditions that may cause a network to deviate from expected performance in the future.

One device that is used to identifying network conditions is a protocol analyzer, also called a network analyzer. Generally, a protocol analyzer runs in the background of a network, capturing, examining and logging packet traffic. A protocol analyzer operates by capturing selected portions of data from a data stream that is transmitted via a communications network. The captured information may then be analyzed in greater detail by the protocol analyzer to extract desired information. For example, data transmission faults or errors, or performance errors, known generally as problem conditions, may be diagnosed by examining the captured data that is related to the problem.

Another device that is used to identify network conditions is a generator. Generally, generators generate network traffic to simulate various network conditions. For example, a generator can generate network traffic that simulates a data stream between two nodes on a communications network. The behavior of the two nodes, as well as other nodes of the communication network, can be evaluated to determine how the network responds to the simulated data stream. Thus, a network administrator may be able to identify performance deviations and take appropriate measures to prevent the performance deviations from occurring in the future.

Another device that is used to identify network conditions is a bit error rate tester. Generally, bit error rate testers operate by transmitting a predetermined bit sequence onto the data transmission path, and then analyze the predetermined bit sequence when it returns to the bit error rate tester. Typically, such analyses involve comparing the received bit sequence to a copy of the bit sequence that was initially transmitted onto the data transmission path. Results of this comparison can reveal errors within the bit sequence. After the errors in the bit sequence are counted, that information is used to calculate an overall bit error rate. Depending upon the particular value of the bit error rate, various remedial, or other, actions may then be implemented Another device that is used to identify network conditions is a jammer. Generally, jammers provide the ability to selectively alter channel data, including the introduction of errors into channel data paths. Thus, jammers facilitate monitoring the response of a communications network to the altered data, and help determine whether the communications network is capable of functioning without experiencing adverse effects in performance such as loss of data or network traffic interruption. For example, a network system designer can use a jammer to perform any one of a number of different diagnostic tests to determine whether a communication network responded appropriately to incomplete, misplaced or missing data or data sequences, how misdirected or confusing frames are treated, and how misplaced ordered sets are treated.

Protocol analyzers, generators, bit error rate testers, jammers, and possibly other devices that test communication networks (hereinafter collectively referred to as "testing modules") can be implemented on printed circuit boards (often referred to as "cards") that are inserted into a computer system test chassis. Depending on the desired diagnostic functionality, an administrator can insert a particular type of card into a computer system test chassis. For example, when an administrator desires to test a bit error rate for a network, the administrator can insert a bit error rate tester card into a computer system test chassis. Subsequently, when the administrator desires to analyze network traffic, the administrator can remove the bit error rate test card from the computer system test chassis and insert a network analyzer card into the computer system test chassis.

Some computer system test chassis even include multiple card receptacles such that the computer system test chassis can receive a number of cards. Thus, an administrator may have some flexibility to simultaneously test a network for a variety of network conditions. For example, an administrator may include a generator card and a jammer card in a multi-receptacle test chassis to simultaneously utilize both generator and jammer functionality.

To access the functionality of a testing module, an administrator or tester typically utilizes a test computer system to connect to a test chassis over a network connection (e.g., a Local Area Network). Once connected, the administrator or tester sends commands to the test chassis, which interprets the commands and causes the testing module to execute a network test. As test results of the network test are collected (i.e., essentially in real-time), the test results are transferred over the network connection from the test chassis to the test computer system. Received test results can be stored and/or viewed at the test computer system. Transferring test results to and storing test results at the test computer system allows an administrator or tester to easily review test results, both as the test results are generated and subsequent to test result generation.

However, if an test computer system malfunctions after a network test is initiated, it can be difficult, if not impossible, to access test results. A test chassis may continue to send test results to a network address of the test computer system (over the established connection) even when the test computer system is not operating as intended. Thus, data packets containing test results may eventually time out and be removed from the network. Further, during execution of a network test, a corresponding testing module may be configured not to receive additional commands. Thus, when the test computer system malfunctions, it can be difficult for administrators or testers at other computer systems to stop the network test. In fact, there may be no way to stop the network test without removing power form the test chassis and/or testing module. Unfortunately, removing power from a test chassis can cause other network tests to stop thereby inconveniencing other administrators and/or testers that have initiated these other network tests.

Further, since test results are transferred to the test computer system (over the established connection), there may be no way to view or store the test results at other computer systems. Thus, an administrator or tester that initiates a network test at an office computer system may be required to return the office computer system to access test results. Returning to an office computer system can inconvenience an administrator or tester that must return to the office computer system from another location (e.g., at home) to access test results. Therefore systems, methods, and computer program products for providing more reliable and flexible access to test results would be advantageous.

BRIEF SUMMARY OF THE INVENTION

The foregoing problems with the prior state of the art are overcome by the principles of the present invention, which are directed towards methods, systems, computer program products for accessing results of network diagnostic functions in a distributed system. A number of computer systems are network connectable to a chassis that contains one or more network diagnostic modules. In some embodiments, diagnostic modules can include one or more programmable logic modules (e.g., one or more Field Programmable Gate Arrays ("FPGAs")) that have circuitry for implementing any of a plurality of different network diagnostic functions (e.g., network analyzer, jammer, generator, bit rate error tester, etc). Each programmable logic module controls one or more test ports that provide interfaces for different physical configurations (e.g., Gigabit Ethernet, Fiber Distributed Data Interface, Fiber Channel, etc.) and that can interoperate with the programmable logic module to implement a selected network diagnostic function. Computer systems can send instructions to the chassis to configure a network module for a specified diagnostic function or to initiate a specified diagnostic function.

A requesting computer system sends a resource allocation request to the chassis. The chassis receives the resource allocation request and allocates resources for a network diagnostic function. For example, a device broker at the chassis can allocate a network diagnostic module and one or more test ports for use by the requesting computer system. The device broker can refer to chassis state information to identify resources that are available for allocation (e.g., that are not currently allocated). The chassis sends an indication of the allocation resources to the requesting computer system. The requesting computer system receives the indication of the allocated resources.

The requesting computer system sends function initiation instructions directly to an allocated resource. For example, the requesting computer system can send a network diagnostic module command directly to an allocated network diagnostic module. The chassis receives the function initiation commands at the allocated resource, such as, for example, the allocated network diagnostic module. The allocated resource initiates a network diagnostic function (e.g., network analyzer, jammer, generator, bit rate error tester, etc.) in accordance with the received function initiation instructions. For example, a network diagnostic module can configure test ports to interoperate (with one another and the network diagnostic module) to implement a network diagnostic function.

The requesting computer system operates in a stateless manner with respect to allocated resources. That is, once execution of a network diagnostic function begins, the requesting computer system is not required to provide additional information to or receive additional information from the network diagnostic module. The chassis collects results resulting from execution of the network diagnostic function. Collected results can be stored at the chassis.

Subsequent to initiation of the diagnostic function, a monitoring computer system sends a results request directly to an allocated resource. The monitoring computer may be the requesting computer system or may be some other computer system that is network connectable to the chassis. The chassis receives the results request at the allocated resource and identifies results corresponding to the network diagnostic function. The chassis returns identified results to the monitoring computer system. The monitoring computer system receives the results directly from the allocated resource and presents the received resources at a user-interface. Accordingly, since a requesting and monitoring computer system can differ, results of network diagnostic functions can be accessed with increased flexibility.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for accessing results of network diagnostic functions in a distributed system. A chassis contains one or more network diagnostic modules. In some embodiments, network diagnostic modules can include one or more programmable logic modules (e.g., one or more Field Programmable Gate Arrays ("FPGAs")) with circuitry for implementing any of a plurality of different network diagnostic functions (e.g., network analyzer, jammer, generator, bit rate error test, etc). Each programmable logic module controls one or more test ports that provide interfaces for different physical configurations (e.g., Gigabit Ethernet, Fiber Distributed Data Interface, Fiber Channel, etc.) and that can interoperate with the programmable logic module to implement a selected network diagnostic function. It may be that a network diagnostic module is included in a printed circuit board (hereinafter referred to as a "card" or "blade") that is inserted into an appropriate receptacle at a chassis (e.g., using a Peripheral Component Interconnect ("PCI") interface). Accordingly, the network diagnostic module may exchange data through electrical contacts of the receptacle.

Configurable network diagnostic modules can receive bit files that contain instructions for implementing a selected diagnostic function at one or more test ports that interface with a network. A bit file can be received from a mass storage device or even from a memory location at the network diagnostic module. Instructions can include computer-executable or computer-interpretable code that is processed by the network diagnostic module to implement the selected network diagnostic function. The network diagnostic module identifies a programmable logic module (e.g., an FPGA) that controls the one or more test ports. The network diagnostic module loads the included instructions at the identified programmable logic module to cause the programmable logic module and the one or more test ports to interoperate to implement the selected diagnostic function. Accordingly, instructions contained in a bit file can be loaded at an FPGA to cause the FPGA to implement any of a network analyzer, jammer, bit error rate tester, generator, etc. When a new implementation is desired (e.g., changing from a jammer to a bit error rate tester) instructions from a new bit file can be loaded.

It may be that a network diagnostic function is part of a "port personality" represented in a bit file. For example, a port personality can include a network diagnostic function, a speed (e.g., 1.065, 2.5, or 10.3125 Gigabits per second), and a protocol (e.g., Fiber Channel, Gigabit Ethernet, Infiniband, etc). Thus, a programmable logic module can process computer-executable or computer-interpretable instructions to cause a programmable logic module and a corresponding test port or test ports to interoperate to implement a port personality in accordance with the processed computer-executable or computer-interpretable instructions. For example, a programmable logic module can process instructions from a bit file to cause the programmable logic module and corresponding test ports to interoperate to implement a Fiber Channel jammer at 2.125 Gb/s. Accordingly, the personality of the corresponding test ports can include implementation of a particular network diagnostic function.

In some embodiments, a number of network diagnostic modules are included in a common chassis computer system. Thus, chassis computer systems with increased numbers of flexibly configurable test ports can be utilized to test a network. A common chassis computer system can include a mass storage interface for transferring network diagnostic data (e.g., test results) to and/or from a mass storage device, a trigger port for detecting the occurrence of events, an interconnect port for connecting to other chassis, and a remote access port for receiving commands from remote computer systems. Connected chassis can exchange control signals over links between corresponding interconnect ports. Accordingly, network diagnostic modules at a number of different chassis can be controlled from any of the other chassis. Connecting a number of chassis together can further increase the number test ports utilized to test a network.

Figure 1:
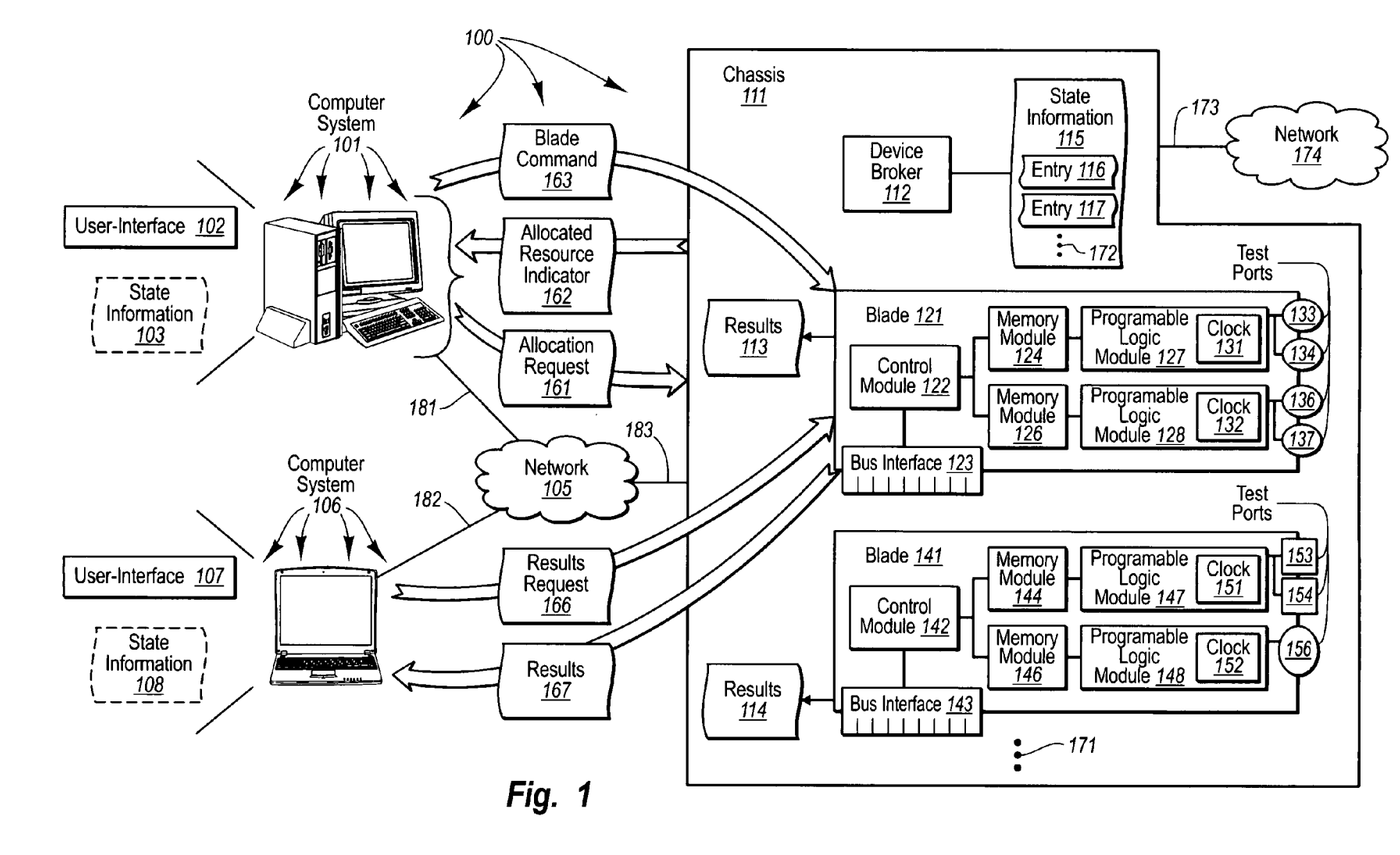
FIG. 1 illustrates an example of network architecture and associated modules and data structures for accessing results of network diagnostic functions in accordance with the principles of the present invention.

FIG. 1 illustrates an example of network architecture 100 and associated modules and data structures for accessing results of network diagnostic functions in accordance with the principles of the present invention. FIG. 1 depicts computer system 101, computer system 106, and chassis 111, which are connected to network 105 by corresponding links 181, 182, and 183 respectively. Network 105 can be a Local Area Network ("LAN"), Wide Area Network ("WAN") or even the Internet. Chassis 111 is further connected to network 174 by corresponding link 173. Network 174 can be a network that is to be tested by components of chassis 111. Thus, it may be that computer system 101 (or computer system 106) sends instructions to chassis 111 that cause components of chassis 111 to perform network diagnostic functions on network 174. Computer system 101, computer system 106 and chassis 111 can utilize network 105 and network 174 to compatibility transfer electronic messages in accordance with any number of different protocols, such as, for example, Internet Protocol ("IP") and other protocols (e.g., Transmission Control Protocol ("TCP"), Simple Mail Transfer Protocol ("SMTP"), and HyperText Transfer Protocol ("HTTP")) that utilize IP.

Computer system 101 includes user-interface 102 (e.g., a Web-based interface). User-Interface 102 can query chassis 111 for data, such as, for example, state information representing the configuration of chassis resources and results generated by network diagnostic functions. For example, user-interface 102 can query state information 115 for the configuration of blades 121 and 141 and test ports 133, 134, 136, 137, 153, 154, and 156. Similarly, user-interface 102 can query diagnostic results 113 and 114 for the results of network diagnostic functions implemented at blades 121 and 141 respectively. User-interface 102 can also issue commands to chassis 111 requesting that chassis resources be allocated for a network diagnostic function. For example, user-interface 102 can issue function initiation instructions to chassis 111 requesting that a network analyzer be implemented at test ports 133 and 134. User-interface 102 can issue queries and commands in response to user input.

Computer system 106 includes user-interface 107, which has functionality similar to user-interface 102.

Chassis 111 (which may be a chassis computer system) includes device broker 112, state information 115, and blades 121 and 141. Chassis 111 is expressly depicted as including two blades (blades 121 and 141). However, vertical ellipsis 171 (a sequence of three vertical periods) represents that chassis 111 can include one or more additional blades. Each blade at chassis 111 can include one or more programmable logic modules that are capable of interoperating with one or more test ports to implement network diagnostic functions. For example, programmable logic module 127 can interoperate with test ports 133 and 134 to implement an Infiniband jammer.

Memory modules (e.g., memory modules 124, 126, 144, and 146) can store instructions for corresponding programmable logic modules (e.g., corresponding programmable logic modules 127, 128, 147, and 148 respectively). Memory modules can also buffer data that is transferred between programmable logic modules and corresponding control modules (e.g., corresponding control modules 122 and 142). Memory modules can include any of a variety of different types of memory, such as, for example, Random Access Memory ("RAM").

Bus interfaces (e.g., bus interfaces 123 and 143) can be inserted into an appropriate receptacle (e.g., a Peripheral Component Interconnect ("PCI") interface) at a chassis to communicatively corresponding blades (e.g., corresponding blades 121 and 141) to the chassis. Blades can communicate (e.g., sending and receiving appropriate electrical signaling) with a bus (e.g., a PCI bus) through a bus interface. Clocks (e.g., clocks 131, 132, 151, and 152) can coordinate the appropriate timing of data transferred to and from corresponding test ports.

Device broker 112 can receive commands from computer systems requesting that chassis resources (e.g., blades and test ports) be allocated for network diagnostic functions.

Device broker 112 can alter the configuration of chassis 111 to satisfy requests for chassis resources. For example, device broker 112 can cause programmable logic module 128 to load a bit file for implementing a 2.125 GB/s Gigibit Ethernet BERT at test port 136. Device broker 112 can update state information 115 to reflect changes in chassis configuration. State information 115 can include one or more entries (e.g., entries 116 and 117) that identify chassis resources and how the chassis resources are currently configured. Vertical ellipsis 172 represents that additional entries can be included in state information 115.

Device broker 112 can also indicate to a computer system the resources that have been allocated to satisfy a request. For example, device broker 112 could return an indication that test port 156 (and thus also blade 121 and programmable logic module 148) has been allocated to satisfy a request for a 10 GBps Gigabit Ethernet BERT. Upon receiving an indication of allocated resources, a computer system can then communicate directly with the allocated resources. Thus, if device broker 112 or other components subsequently fail or otherwise do not operate as intended, the computer system can continue to utilize the allocated resources.

Blades can be configured to collect the results (e.g., diagnostic results 113 and 114) of implemented network diagnostic functions. Collected results can be stored at the blade, in a storage device at a corresponding chassis, or stored at an external storage device. A control module can maintain the location of collected results so the location can be indicated to a computer system that requests collected results. For example, control module 142 can maintain the location of diagnostic results 114.

Collected results can include logs and statistics corresponding to individual ports and/or summarized statistics for all the ports of a blade. Logs can include the data that was sent and/or received at a port. Statistics can include status information, total bit errors, etc. Log data and statistics can be maintained for each port individually, independent of other ports. Collected results can be results resulting from execution of network diagnostic function, such as, for example, a network analyzer, a jammer, a generator, a bit error rate testers, etc.

Figure 2:
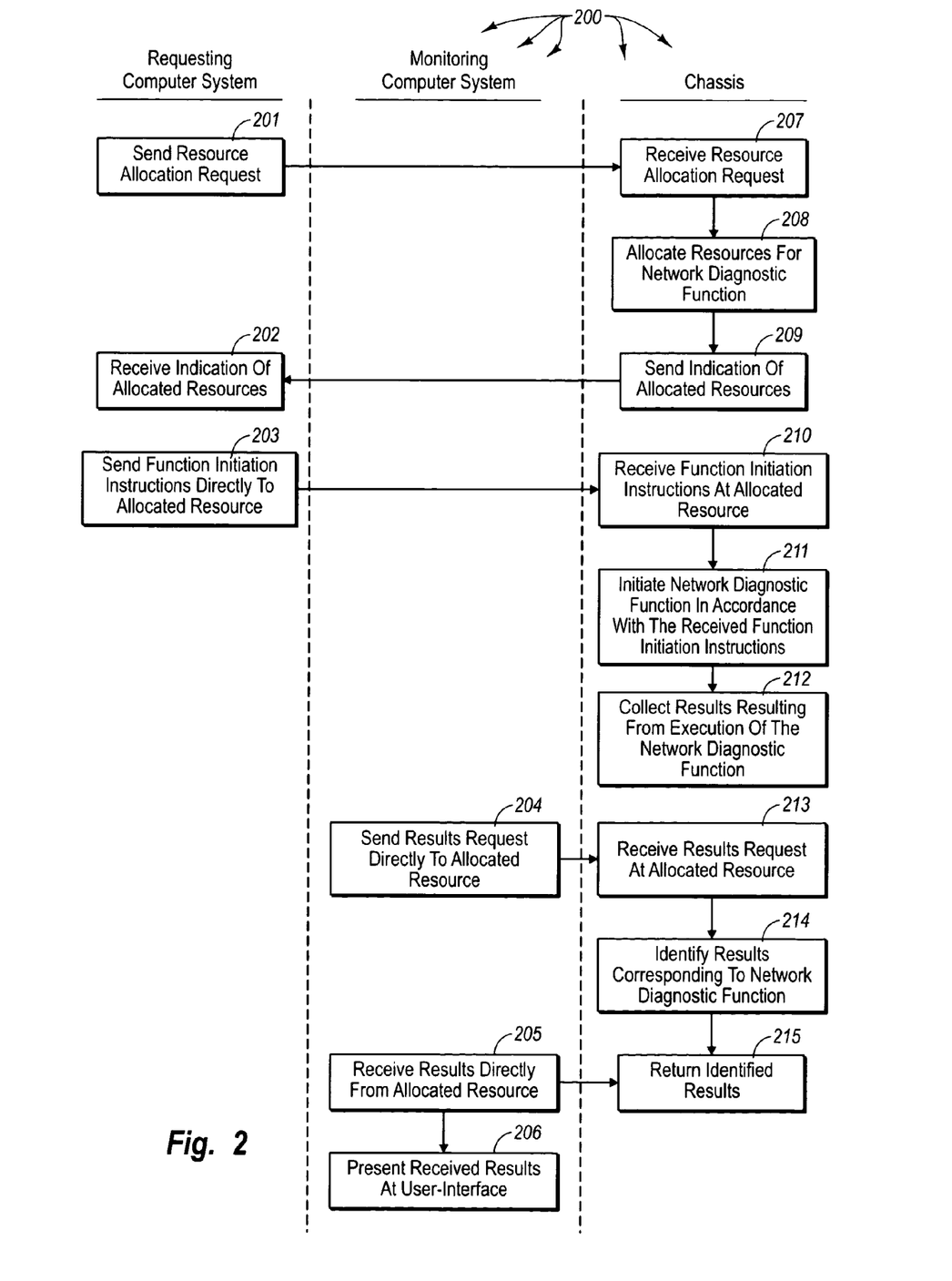
FIG. 2 illustrates a flowchart of a method for accessing results of network diagnostic functions in accordance with the principles of the present invention.

FIG. 2 illustrates a flowchart of a method 200 for accessing results of network diagnostic functions in accordance with the principles of the present invention. The method 200 will be discussed with respect to the modules and data structures depicted in network architecture 100. The method 200 includes an act of sending a resource allocation request (act 201). Act 201 can include a requesting computer system sending a resource allocation request. For example, computer system 101 can send allocation request 161 to chassis 111. Allocation request 161 can request that resources of chassis 111 be allocated to implement a network diagnostic function.

The method 200 includes an act of receiving a resource allocation request (act 207). Act 207 can include a chassis receiving a resource allocation request. For example, chassis 111 can receive resource request 161. Allocation request 161 can be transferred to device broker 112.

The method 200 includes an act of allocating resources for a network diagnostic function (act 208). Act 208 can include a chassis allocating resources for a network diagnostic function. For example, device broker 112 can allocate test ports 136 and 137 for implementing a 2.5 GB/s Fiber Channel jammer on network 174. Device broker 112 can refer to state information 115 to determine the current configuration of blade 121. Depending in part on the current configuration of blade 121, device broker 112 can allocate test ports 136 and 137 (and thus also programmable logic module 138 and blade 121) for implementing the 2.5 GB/s Fiber Channel jammer. For example, entry 116 (an entry for blade 121) may indicate that test ports 136 and 137 are not currently allocated. Device broker 112 can update state information 115 to reflect that test ports 136 and 137 are now allocated for implementing the 2.5 GB/s Fiber Channel jammer.

The method 200 includes an act of sending an indication of allocated resources (act 209). Act 209 can include a chassis sending an indication of allocated resources. For example, chassis 111 can send allocated resource indicator 162 to computer system 101. Allocated resource indicator 162 can indicate to computer system 101 that test ports 136 and 137 have been allocated for implementing a 2.5 GB/s Fiber Channel Jammer. Allocated resource indicator 162 can also include appropriate addressing information for accessing blade 121 directly. Optionally, device broker 112 can also cause a bit file, for implementing a 2.5 GB/s Fiber Channel jammer at test ports 136 and 137, to be loaded at programmable logic module 128.

The method 200 includes an act of receiving an indication of allocated resources (act 202). Act 202 can include a requesting computer system receiving an indication of allocated resources. For example, computer system 101 can receive allocated resource indicator 162. Computer system 101 can utilize address information included in allocated resource indicator 162 to access blade 121 directly.

The method 200 includes an act of sending function initiation instructions directly to an allocated resource (act 203). Act 203 can include the requesting computer system sending function initiation instructions directly to an allocated resource. For example, computer system 101 can send blade command 163 directly to blade 121. Blade command 163 can include instructions for causing a bit file, for implementing 2.5 GB/s Fiber Channel jammer at test ports 136 and 137, to be loaded at programmable logic module 128. Blade command 163 can also include instructions for causing blade 121 to implement the 2.5 GB/s Fiber Channel jammer at test ports 136 and 137. Further, blade command 163 can include instructions that cause blade 121 to begin collecting results for the 2.5 GB/s Fiber Channel jammer implemented at test ports 136 and 137. For example, blade 121 can collect results from implementing the 2.5 GB/s Fiber Channel jammer on network 174.

The method 200 includes an act of receiving function initiation instructions at an allocated resource (act 210). Act 210 can include receiving function initiation instructions at a blade. For example, blade 121 can receive blade command 163.

The method 200 includes an act of initiating the network diagnostic function in accordance with the received function initiation instructions (act 211). Act 211 can include a blade initiating the network diagnostic function in accordance with the function initiation instructions. For example, blade 121 can initiate a network diagnostic function in accordance with blade command 163. Blade command 163 can include instructions for executing a bit file loaded at programmable logic module 128. When appropriate, blade command 163 can also include instructions causing a bit file, for implementing a 2.5 GB/s Fiber Channel jammer at test ports 136 and 137, to be loaded at programmable logic module 128. Accordingly, prior to executing a loaded bit file, blade 121 may cause programmable logic module 128 to load the bit file. Execution of an appropriate bit file can cause programmable logic module 128 and test ports 136 and 137 to interoperate to implement the 2.5 GB/s Fiber Channel jammer on network 174.

The method 200 includes an act of collecting results resulting from execution of the network diagnostic function (act 212). Act 212 can include a blade collecting results resulting from execution of the network diagnostic function. For example, blade 121 can collect results generated by the 2.5 GB/s Fiber Channel jammer implemented at test ports 136 and 137. Blade 121 can populate objects with collected results, such as, for example, logs and/or statistics generated by the 2.5 GB/s Fiber Channel jammer. Blade 121 can store objects contain collected results in the memory module 126 (or other memory of blade 121), at a mass storage device of chassis 111, or at a remote mass storage device (e.g., network connectable to network 105). Blade 121 can initiate collection of results in response to instructions included in blade command 163.

It should be understood that computer system 101 operates in a stateless manner with respect to blade 121. That is, once a network diagnostic function is initiated at blade 121, computer system 101 is not required to provide additional information to blade 121 or receive additional information from blade 121. Further, network diagnostic functions executing at chassis 111 operate independent of the computer system that initiated the network diagnostic functions. For example, a network diagnostic function executing at chassis 111 is not adversely affected if computer system 101 malfunctions. Accordingly, if computer system 101 is powered down or malfunctions, collection of results for the 2.5 GB/s Fiber Channel jammer implemented at test ports 136 and 137 is not affected. However, if desired by a user of computer system 101, user-interface 102 can retrieve and present state information (e.g., state information 103) for blade 121.

Subsequent to network diagnostic function implementation, a computer system can request collected results. For example, some time after the 2.5 GB/s Fiber Channel jammer is implemented at test ports 136 and 137, a monitoring computer system can request results that correspond to the 2.5 GB/s Fiber Channel jammer. A monitoring computer system can be the same computer system as or a different computer system from the requesting computer system. For example, in network architecture 100, although computer system 101 caused a network diagnostic function to execute and results to be collected, computer system 106 can be utilized to access collected results.

The method 200 includes an act of sending a results request directly to an allocated resource (act 204). Act 204 can include a monitoring computer system sending a results request directly to an allocated resource. For example, computer system 106 can send results request 166 directly to blade 121. Results request 166 can include instructions for returning collected results to computer system 106. When appropriate, user-interface 107 can retrieve and present state information (e.g., state information 108) for blade 121. Computer system 106 can utilize state information 108 to determine the configuration of blade 121 (as well as other resources at chassis 121).

The method 200 includes an act of receiving a results request at an allocated resource (act 213). Act 213 can include receiving a results request at a blade. For example, for example, blade 121 can receive results request 166.

The method 200 includes an act of identifying results corresponding to the network diagnostic function (act 214). Act 214 can include a blade identifying results corresponding to the network diagnostic function. For example, blade 121 can identify results corresponding to the 2.5 GB/s Fiber Channel jammer implemented at test ports 136 and 137. Since programmable logic module 127 can implement network diagnostic functions at test ports 133 and/or 134, it may be that blade 121 is collecting results for more that one network diagnostic function. However, blade 121 can return appropriate results that correspond to a results request.

Control module 122 can coordinate the collection of results for different network diagnostic functions such that appropriate results are identified in response to a received results request. For example, control module 122 can identify that results 113 corresponds to the 2.5 GB/s Fiber Channel jammer implemented at test ports 136 and 137. Identifying collected results can include identifying one or more objects that contain logs and/or statistics generated by the 2.5 GB/s Fiber Channel jammer. When collected results are stored at a mass storage device, control module 122 can identify the external storage device and potentially return information for accessing the external storage device to a monitoring computer system.

The method 200 includes an act of returning identified results (act 215). Act 215 can include a blade returning identified results to a monitoring computer system. For example, blade 121 can return results 167 to computer system 106. Results 167 can include one or more objects from results 113. In some embodiments, results 167 are serialized before being returned to computer system 106. Accordingly, results 167 can be returned to computer system 106 as a single transaction, instead of a plurality of smaller transactions.

The method 200 includes an act of receive results directly from an allocated resource (act 205). Act 205 can include a monitoring computer system receiving results directly from a blade. For example, computer system 106 can received results 167 directly from blade 111. In some embodiments, computer system 106 deserializes results 167.

The method 200 includes an act of presenting received results at a user-interface (act 206). Act 206 can include a monitoring computer system presenting received results at a user-interface. For example, computer system 106 can present results 167 at user-interface 107.

Since a requesting computer system and monitoring computer system can differ, results of network diagnostic functions can be accessed with increased flexibility. A first user at a first physical location can initiate a test and the first user or a different user can then view results of the test at a second physical location (potentially some distance away from the first physical location). For example, a technician could initiate a test from an office computer system and subsequently view collected results at a home computer system.

Figure 3:
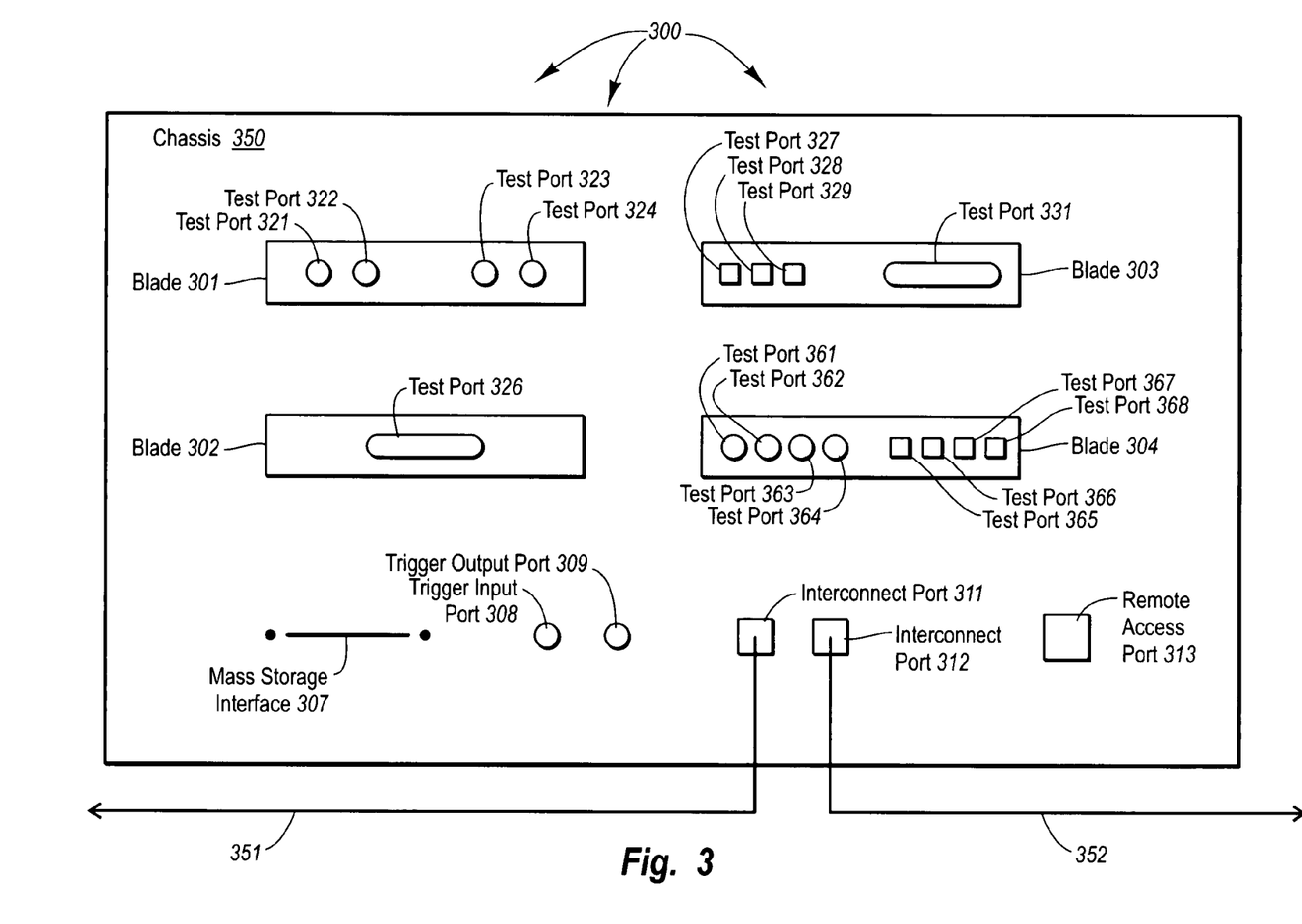
FIG. 3 illustrates an example chassis computer system architecture including a plurality of network diagnostic modules in accordance with the principles of the present invention.

FIG. 3 illustrates an example computer system architecture 300 including a plurality of network diagnostic modules in accordance with the principles of the present invention. Depicted in computer system architecture 300 is chassis 350 (e.g., similar to chassis 111), which includes blades 301, 302, 303, and 304. Although not expressly depicted, each of blades 301, 302, 303, and 304 are coupled, through an appropriate bus interface, to a computer system bus of chassis 350. For example, each of blades 301, 302, 303, and 304 can include PCI bus interfaces that are inserted into PCI receptacles at chassis 350. Accordingly, computer-executable or computer-interpretable instructions can be transferred over the computer system bus to blades 301, 302, 303, and 304 to configure and re-configure corresponding test ports.

Blades coupled to a chassis can have different numbers and configurations of test ports. For example, depicted at blade 301 test ports 321, 322, 323 and 324 can each be small form-factor pluggable ("SFP") ports. Depicted at blade 303 test ports 327, 328 and 329 can be RJ-45 ports and test port 331 can be a 300-pin MSA port. Depicted at blade 302 test port 326 can be a 300-pin MSA port. Depicted at blade 304 test ports 361, 362, 363, and 364 can be SFP ports and test ports 365, 366, 367, and 368 can be RJ-45 ports. Accordingly, the test ports of chassis 350 can be simultaneously connected to the same or a variety of different networks, such as, for example, 10 Gigabit Ethernet, 100 Megabit Ethernet, Infiniband, and SONET networks, etc., to implement the same or a variety of different network diagnostic functions.

Mass storage interface 307 can be an interface for coupling to mass storage devices. Accordingly, as network diagnostic data, for example, results of network diagnostic functions, is collected at blades 301, 302, 303, and 304, the network diagnostic data can be transferred to the mass storage device for storage. Statistics and logs resulting from network diagnostic functions can be stored at a coupled mass storage device. Mass storage interface 307 may be a Small Computer System Interface ("SCSI") that is coupled to a SCSI hard drive.

Interconnect ports 311 and 312 (e.g., RJ-11 ports) can be utilized to connect chassis 350 to other chassis (not shown). Connections from chassis 350 to other chassis, for example, as illustrated by links 351 and 352, can be utilized to transfer control signals that coordinate the collection of network diagnostic data. For example, the collection of network diagnostic data for a network analyzer implemented in blade 304 can be coordinated with the collection of network diagnostic data for a bit error rate tester implemented at another chassis coupled to link 351. Accordingly, through the exchange of control signals, it may be that test ports at a plurality of different chassis are configured to implement network diagnostic functions in a coordinated manner.

Trigger input port 308 and trigger output port 309 (e.g., TTL ports) can be utilized to transfer trigger signals to and from chassis 350. Generally, trigger signals can indicate the occurrence of an event to a chassis. In response to the occurrence of an event, a chassis can activate or deactivate network diagnostic functionality. For example, it may be that a programmable logic module controlling test port 326 is implementing a bit error rate tester. However, it may be desirable to activate bit error rate testing of a network coupled to port 326 only when a particular computer system is transmitting data onto the network. An appropriate mechanism for detecting when the particular computer system is transmitting data can be utilized to generate a trigger signal.

When a trigger signal is detected at trigger input port 308, bit error rate testing through port test 326 can be activated. When the trigger signal is no longer detected at trigger input port 308, bit error rate testing through test port 326 can be deactivated. In some embodiments, for example, when a plurality of chassis are connected, trigger inputs and trigger outputs of different chassis can be coupled together so that the chassis receive the same triggers. For example, trigger input port 308 can be coupled to a trigger output port of a chassis connected to link 351 and/or trigger output port 309 can be coupled to a trigger input port of a chassis connected to link 352. Accordingly, when test ports at a plurality of different chassis are configured to perform coordinated network diagnostic functions, the network diagnostic functions can be activated and deactivated in response to the same events.

Remote access port 313 (e.g., an RJ-45 port) can be utilized to remotely configure chassis 350. Through remote access port 313, chassis 350 can be coupled to a network, such as, for example, a Local Area Network ("LAN") or Wide Area Network ("WAN"), along with one or more other computer systems (e.g., computer systems 101 and/or 106). The other computer systems can utilize the network to access configuration information from chassis 350. The other computer systems can also initiate configuration requests to configure or re-configure ports included in chassis 350, can initiate requests to implement network diagnostic functions, and can request collected results. Accordingly, an administrator or user at a remote computer system can configure the test ports of chassis 350 (as well as configuring test ports at other chassis connected to the network) to implement selected network diagnostic functions and can request collected results.

Figure 4:
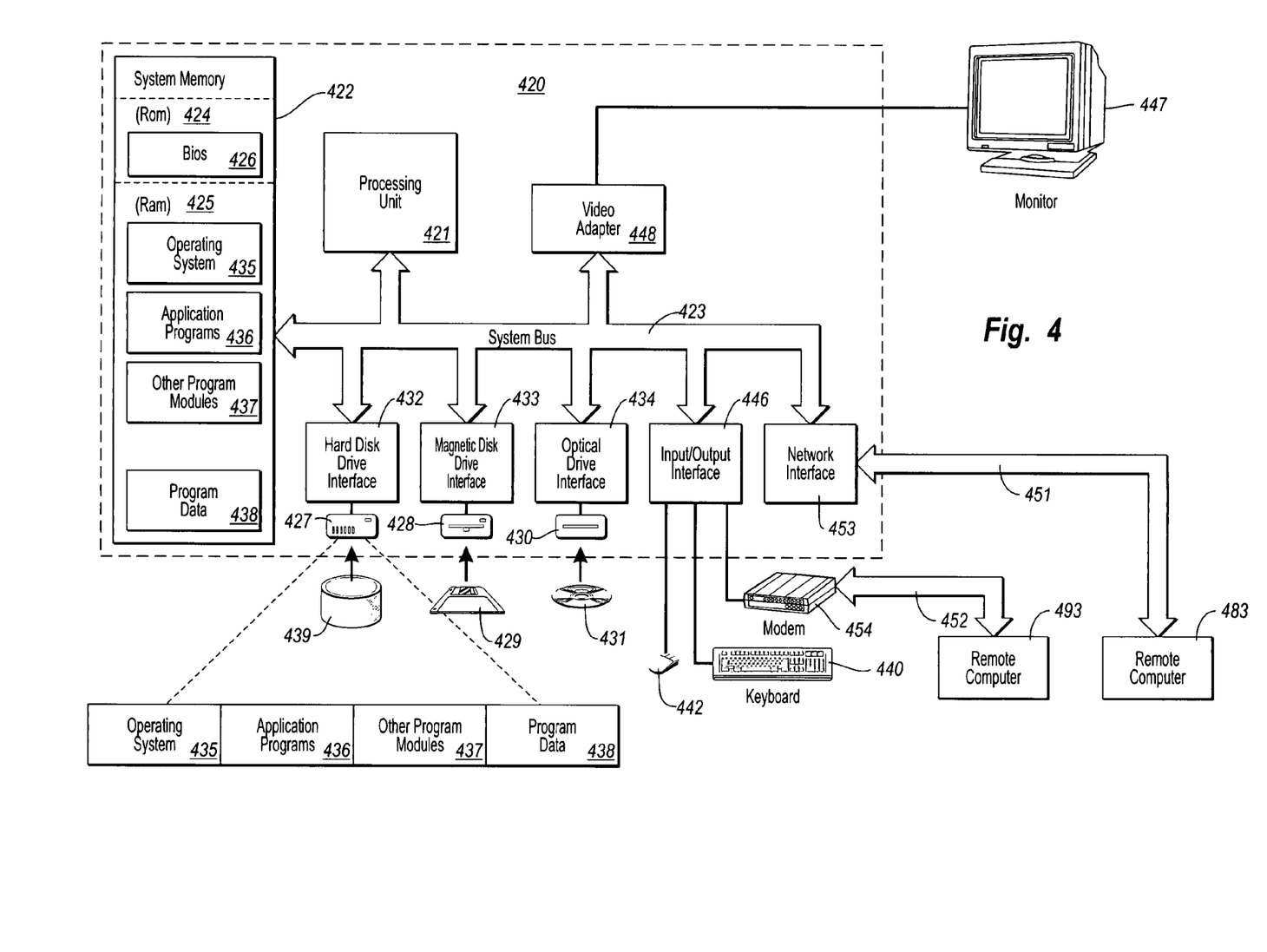
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a PCI bus, a peripheral bus, and a local bus using any of a variety of bus architectures. Computer system 420 can include one or more receptacles for receiving print circuit boards or "cards" that interface with system bus 423. System memory 422 includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 (e.g., a SCSI drive) for reading from and writing to a magnetic hard disk 439, a magnetic disk drive 428 for reading from or writing to a removable magnetic disk 429, and an optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like. Collected test results can be stored at any of the described computer readable media.

Program code means comprising one or more program modules may be stored on the hard disk 439, magnetic disk 429, optical disk 431, ROM 424 or RAM 425, including an operating system 435, one or more application programs 436, other program modules 437 (e.g., bit files), and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, chassis containing network diagnostic modules, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 483 via link 451. Link 451 represents a portion of a network, and remote computer system 483 represents a node of the network.

Likewise, computer system 420 includes input/output interface 446, through which computer system 420 receives data from external sources and/or transmits data to external sources. Input/output interface 446 is coupled to modem 454, through which computer system 420 receives data from and/or transmits data to external sources. Alternately, modem 454 can be a Data Over Cable Service Interface Specification ("DOCSIS") modem or digital subscriber lines ("DSL") modem that is connected to computer system 420 through an appropriate interface. However, as depicted in FIG. 4, input/output interface 446 and modem 454 facilitate the exchange of data with remote computer system 493 via link 452. Link 452 represents a portion of a network, and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 483 and/or remote computer system 493. Execution of such modules may be performed in a distributed manner.

Figure 5:
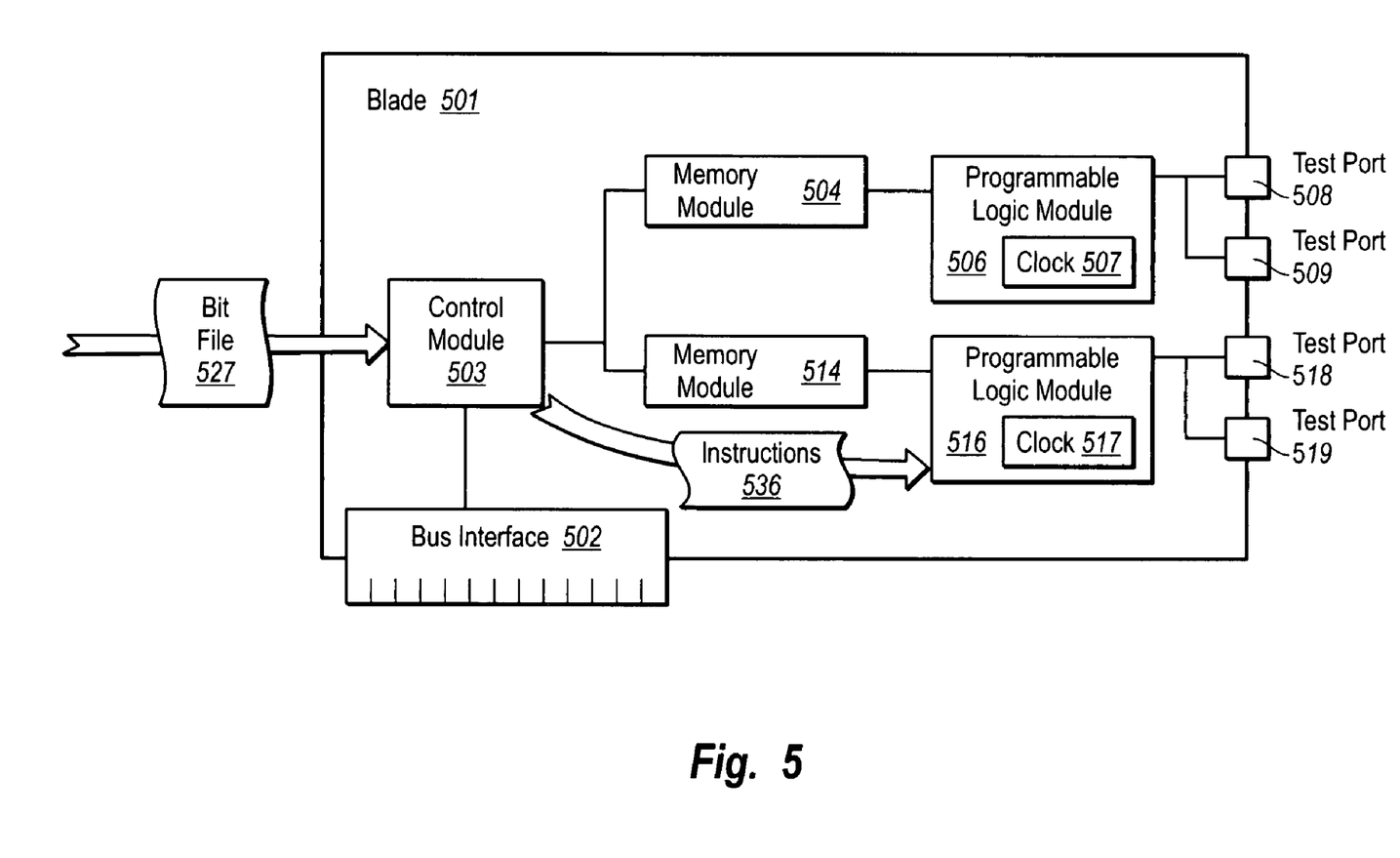
FIG. 5 illustrates an example of a network diagnostic module and test ports that can interoperate to implement a network diagnostic function in accordance with the principles of the present invention.

FIG. 5 illustrates an example of a network diagnostic module and test ports that can interoperate to implement a network diagnostic function. The network diagnostic module and test ports are implemented in blade 501, which can be a printed circuit board. Bus interface 502 can be inserted into an appropriate receptacle (e.g., a PCI interface) at a chassis (or other computer system) to communicatively couple blade 501 to the chassis (or other computer system). Blade 501 can communicate (e.g., sending and receiving appropriate electrical signaling) with a corresponding chassis (or other computer system) bus (e.g., a PCI bus) through bus interface 502.

Blade 501 includes memory 504 and programmable logic module 506 that control the functionality of test ports 508 and 509. Memory 504 can be any of a variety of different types of memory, such as, for example, Random Access Memory ("RAM"). Memory 504 can be used to store instructions for programmable logic module 506 and to buffer data that is transferred between programmable logic module 506 and control module 503. Programmable logic module 506 can be virtually any type of programmable circuit, such as, for example, a Field-Programmable Gate Array ("FPGA"), Programmable Logic Array ("PLA"), or other type programmable logic device. Programmable logic module 506 can include circuitry for implementing any of a plurality of network diagnostic functions (e.g., network analyzer, jammer, generator, or bit error rate tester, etc).

Programmable logic module 106 can process computer-executable or computer-interpretable instructions to cause programmable logic module 506 and test port 508 and/or test port 509 to interoperate to implement a port personality in accordance with the processed computer-executable or computer-interpretable instructions. For example, programmable logic module 506 can process instructions from a bit file to cause programmable logic module 506, test port 508 and test port 509 to interoperate to implement a Fiber Channel jammer at 2.125 Gb/s. Accordingly, the personality of test port 508 and the personality of test port 509 can include implementation of a particular network diagnostic function.

It may that a plurality of test ports are utilized together to implement a particular network diagnostic function. For example, test ports 508 and 509 can be utilized together to implement a network analyzer. On the other hand, it may be a first test port is utilized to implement a first network diagnostic function, while a second different test port is simultaneously utilized to implement a second different network diagnostic function. For example, test port 508 can be utilized to implement a generator, while test port 509 is simultaneously utilized to implement a bit error rate tester. A bit file having appropriate instructions can be loaded at programmable logic module 506 to cause test port 508 and test port 509 to simultaneously implement different network diagnostic functions. Clock 507 can coordinate the appropriate timing of data transferred to and from test port 508 and test port 509.

Blade 501 also includes memory 514 and programmable logic module 516 that control the functionality of test ports 518 and 519. Similar to memory 504, memory 514 can be any of a variety of different types of memory, such as, for example, Random Access Memory ("RAM"). Memory 514 can be used to store instructions for programmable logic module 516 and to buffer data that is transferred between programmable logic module 516 and control module 503. Similar to programmable logic module 506, programmable logic module 516 can be virtually any type of programmable circuit, such as, for example, a Field-Programmable Gate Array ("FPGA"), Programmable Logic Array ("PLA"), or other type programmable logic device. Similar to programmable logic module 506, programmable logic module 516 can include circuitry form implementing any of a plurality of network diagnostic functions (e.g., network analyzer, jammer, generator, or bit error rate tester, etc). Although not required, it may be that programmable module 506 and programmable logic module 516 are the same type of programmable logic module.

Similar to programmable logic module 506, programmable logic module 516 can process computer-executable or computer-interpretable instructions (e.g., instructions 536) to cause programmable logic module 516 and test port 518 and/or test port 519 to interoperate to implement a port personality (including network diagnostic function, speed, and protocol) in accordance with the processed computer-executable or computer-interpretable instructions. Test ports 518 and 519 can be utilized together to implement a particular network diagnostic function.

On the other hand, test port 518 may be utilized to implement a first network diagnostic function, while test port 519 is utilize to implement a second different network diagnostic function. For example, programmable logic module 516 can process instructions from a bit file (e.g., bit file 527) to cause programmable logic module 516 and test ports 518 to interoperate to implement a Fiber Channel bit error rate test at 10.51875 Gb/s and to cause programmable logic module 516 and test ports 519 to interoperate to implement a Infiniband generator at 1.065 Gb/s. A bit file having appropriate instructions (e.g., instructions 536) can be loaded at programmable logic module 516 to cause test port 518 and test port 519 to simultaneously implement different network diagnostic functions. Clock 517 can coordinate the appropriate timing of data transferred to and from test port 518 and test port 519.

Test ports of different programmable logic modules can be configured to implement the same personalities. For example, programmable logic module 506 may process instructions that that cause test ports 508 and 509 to implement a Gigabit Ethernet analyzer at 1.065 GB/s, while programmable logic module 516 also processes instructions that cause test ports 518 and 519 to implement a Gigabit Ethernet analyzer at 1.065 GB/s. On the hand, test ports of different programmable logic modules can be configured to implement different personalities. For example, programmable logic module 106 may process instructions that that cause test ports 508 and 509 to implement a Fiber Channel analyzer at 2.125 GB/s, while programmable logic module 116 processes instructions that cause test ports 518 and 519 to implement an Infiniband analyzer at 10.51875 GB/s.

Test ports 508, 509, 518 and 519 can be of virtually any physical configuration, such as, for example, RJ-11, RJ-45, SFP, Universal Serial Bus ("USB"), IEEE 1394 (Firewire), 300-pin MSA, etc. Test ports 508, 509, 518 and 519 can also be physically configured to receive virtually any type of cabling, such as, for example, cabling that carries electrical signals or carries optical signals. Although not required, it may be that ports controlled by the same programmable logic module are configured as the same type of port. For example, test ports 508 and 509 (both controlled by programmable logic module 506) may both be SFP ports configured to receive optical cable.

Control module 503 coordinates the transfer of data between bus interface 502 and memories 504 and 514. Control module 503 can translate data received from bus interface 502 (e.g., a PCI interface) into a format that can be processed by programmable logic modules included in blade 501. Likewise, control module 503 can translate data received from a programmable logic module into a format that can be compatibly transferred over a computer system bus (e.g., a PCI bus) that is communicatively coupled to bus interface 502. Based on received data (e.g., appropriate addressing information), control module 503 can also identify the programmable logic module that is associated with the received data. Accordingly, control module 503 can transfer at least a portion of the received data (e.g., computer-executable or computer-interpretable instructions) to the associated programmable logic module.

The present invention may be embodied in other specific forms without departing from its spirit or essential characteristics. The described embodiments are to be considered in all

What is claimed and desired secured by United States Letters Patent is:

1. In a requesting computer system that is network connectable to one or more chassis that each include one or more network diagnostic modules, a method for implementing a change in a network diagnostic function, the method comprising the acts of:
sending a resource allocation request to a chassis from among the one or more chassis, the resource allocation request requesting that resources be allocated for implementing a network diagnostic function;
receiving an indication of the chassis resources that were allocated for implementing the network diagnostic function; and
sending function initiation instructions directly to an allocated resource, the function initiation instructions instructing the allocated resource to implement the network diagnostic function and collect results generated by the network diagnostic function, wherein the function initiation instructions are configured to change the diagnostic functionality of a network diagnostic module from a protocol analyzer to a generator, from a protocol analyzer to a bit error rate tester, from a protocol analyzer to a jammer, from a generator to a bit error rate tester from a generator to a jammer or from a jammer to a bit error rate tester.

2. The method as recited claim 1, wherein the act of sending a resource allocation request to a chassis from among the one or more chassis comprises an act of sending an electronic message to the chassis.

3. The method as recited in claim 1, wherein the act of receiving an indication of the chassis resources that were allocated for implementing the network diagnostic function comprises an act of receiving an indication that a blade was allocated for implementing the network diagnostic function.

4. The method as recited in claim 1, wherein the act of receiving an indication of the chassis resources that were allocated for implementing the network diagnostic function comprises an act of receiving an indication that a one or more test ports were allocated for implementing the network diagnostic function.

5. The method as recited in claim 1, wherein the act of sending function initiation instructions directly to an allocated control resource comprises an act of sending function initiation instructions directly to a blade contained in the chassis.

6. The method as recited in claim 1, further comprising the acts of:
sending a results request directly to a results gathering resource at the chassis, the results request requesting results generated by the network diagnostic function, the results gathering resource being allocated to the network diagnostic function;
receiving results generated by the network diagnostic function, the results being received directly from the results gathering resource; and
presenting the received results at a user-interface.

7. The method as recited in claim 6, wherein sending a results request directly to a results gathering resource at the chassis comprises an act of sending a results request directly to a blade contained in the chassis.

8. In first and second computer systems that are network connectable to one or more chassis that each include one or more network diagnostic modules, a method for implementing a change in and accessing results for a network diagnostic function, the method comprising the acts of:
a first computer system sending a resource allocation request to a chassis from among the one or more chassis, the resource allocation request requesting that resources be allocated for implementing a network diagnostic function;
the first computer system receiving an indication of the chassis resources that were allocated for implementing the network diagnostic function;
the first computer system sending function initiation instructions directly to an allocated resource, the function initiation instructions instructing the allocated resource to implement the network diagnostic function and collect results generated by the network diagnostic function, wherein the function initiation instructions are configured to change the diagnostic functionality of a network diagnostic module from a protocol analyzer to a generator, from a protocol analyzer to a bit error rate tester, from a protocol analyzer to a jammer, from a generator to a bit error rate tester from a generator to a jammer or from a jammer to a bit error rate tester;
a second computer system sending a results request directly to one of a plurality of blades contained in a chassis from among the one or more chassis, the results request requesting results generated by a network diagnostic function to which the blade is allocated;
the second computer system receiving results generated by the network diagnostic function, the results being received directly from the blade; and
the second computer system presenting the received results at a user-interface.

9. The method as recited in claim 8, wherein the act of sending a results request directly to the blade comprises an act of sending an electronic message.

10. The method as recited in claim 8, wherein the act of receiving results generated by the network diagnostic function comprises an act of deserializing one or more objects containing logs and/or statistics generated by the network diagnostic function.

11. In a chassis that is network connectable to one or more computer systems, a method for configuring chassis resources to a implement a network diagnostic function and collect results generated by the network diagnostic function, the method comprising the acts of:
receiving a resource allocation request from a requesting computer system from among the one or more computer systems, the resource allocation request requesting chassis resources be allocated for implementing a first network diagnostic function;
allocating chassis resources for implementing the first network diagnostic function;
sending an indication of the allocated chassis resources to the requesting computer system;
receiving function initiation instructions directly at an allocated resource;
the allocated resource initiating the first network diagnostic function in accordance with the function initiation instructions; and
the allocated resource collecting results generated by the first network diagnostic function,
wherein the function initiation instructions, when executed, change a diagnostic functionality of the allocated chassis resource from implementing a second diagnostic function to implementing the first diagnostic function.

12. The method as recited in claim 11, wherein the act of allocating chassis resources for performing the first network diagnostic function comprises allocating a blade to perform the network diagnostic function.

13. The method as recited in claim 11, wherein the act of allocating chassis resources for performing the first network diagnostic function comprises allocating one or more test ports to perform the network diagnostic function.

14. The method as recited in claim 11, wherein act of the allocated resource collecting results generated by the first network diagnostic function comprises an act of a blade collecting results generated by the first network diagnostic function.

15. In a chassis that is network connectable to one or more computer systems, a method for returning results generated by a network diagnostic function, the method comprising the acts of:
receiving function initiation instructions directly at an allocated resource, the initiation instructions being sent from a requesting computer system;
the allocated resource initiating the network diagnostic function in accordance with the function initiation instructions;
the allocated resource collecting results generated by the network diagnostic function;
the allocated resource receiving a results request from a monitoring computer system that is separate from the requesting computer system, the results request requesting results generated by the network diagnostic function;
the allocated resource identifying results that correspond to the network diagnostic function; and
returning the identified results to the monitoring computer system.

16. The method as recited in claim 15, wherein the act of the allocated resource initiating the network diagnostic function comprises an act of a blade interoperating with one or more test ports to implement the network diagnostic function.

17. The method as recited in claim 15, wherein the act of the allocated resource initiating the network diagnostic function comprises an act of loading and/or executing a bit file.

18. The method as recited in claim 15, wherein the act of the allocated resource collecting results generated by the network diagnostic function comprises an act of populating one or more objects with statistics and/or logs.

19. The method as recited in claim 15, wherein the act of the allocated resource receiving a results request from a monitoring computer system comprises an act of receiving a results request from the requesting computer system.

20. The method as recited in claim 15, wherein the act of returning the identified results to the monitoring computer system comprises an act of serializing one or more objects that contained statistics and/or logs.

21. A computer program product for use in a computer system that is network connectable to one or more chassis, each chassis including one or more network diagnostic modules, the computer program product for implementing a method for implementing a network diagnostic function, the computer program product comprising one or more computer-readable media having stored thereon computer executable instructions that, when executed by a processor, cause the computer system to perform the following:
send a resource allocation request to a chassis from among the one or more chassis, the resource allocation request requesting that resources be allocated for implementing a first network diagnostic function;
receive an indication of the chassis resources that were allocated for implementing the first network diagnostic function; and
send function initiation instructions directly to an allocated resource, the function initiation instructions instructing the allocated resource to change a diagnostic functionality of the allocated chassis resource from a second diagnostic function to the first network diagnostic function and to collect results generated by the first network diagnostic function.

22. A computer program product for use in a computer system that is network connectable to one or more chassis, each chassis including one or more network diagnostic modules, the computer program product for implementing a method for accessing results generated by a network diagnostic function, the computer program product comprising one or more computer-readable media having stored thereon computer executable instructions that, when executed by a processor, cause the computer system to perform the following:
send a resource allocation request to a chassis from among the one or more chassis, the resource allocation request requesting that resources be allocated for implementing a network diagnostic function;
receive an indication of the chassis resources that were allocated for implementing the network diagnostic function;
send function initiation instructions directly to an allocated resource, the function initiation instructions instructing the allocated resource to implement the network diagnostic function and collect results generated by the network diagnostic function, wherein the function initiation instructions are configured to change the diagnostic functionality of a network diagnostic module from a protocol analyzer to a generator, from a protocol analyzer to a bit error rate tester, from a protocol analyzer to a jammer, from a generator to a bit error rate tester from a generator to a jammer or from a jammer to a bit error rate tester;
send a results request directly to one of a plurality of blades contained in a chassis from among the one or more chassis, the results request requesting results generated by a network diagnostic function to which the blade is allocated;
receive results generated by the network diagnostic function, the results being received directly from the blade; and
present the received results at a user-interface.

23. A computer program product for use in a chassis that is network connectable to one or more computer systems, the computer program product for implementing a method for configuring chassis resources to implement a network diagnostic function and collect results generated by the network diagnostic function, the computer program product comprising one or more computer-readable media having stored thereon computer executable instructions that, when executed by a processor, cause components of the chassis to perform the following:
receive a resource allocation request from a requesting computer system from among the one or more computer systems, the resource allocation request requesting chassis resources be allocated for implementing a first network diagnostic function;
allocate chassis resources for implementing the first network diagnostic function;

send an indication of the allocated chassis resources to the requesting computer system;

receive function initiation instructions directly at an allocated resource;

initiate the first network diagnostic function in accordance with the function initiation instructions; and collect results generated by the first network diagnostic function, wherein the function initiation instructions, when executed, change a diagnostic functionality of the allocated chassis resource from implementing a second diagnostic function to implementing the first diagnostic function.

24. A computer program product according to claim 23, the computer program product further comprising one or more computer-readable media having stored thereon computer executable instructions that, when executed by a processor, cause components of the chassis to exchange control signals with a connected chassis over links between corresponding interconnected ports of the two chassis.

25. The method as recited in claim 11, wherein the first diagnostic function is one of:

a protocol analyzer, a generator, a bit error rate tester, and a jammer, and the second diagnostic function is another one of:

a protocol analyzer, a generator, a bit error rate tester, and a jammer.

* * * * *